United States Patent
Cowans

(10) Patent No.: US 9,435,255 B2
(45) Date of Patent: Sep. 6, 2016

(54) VCRC ENGINE WITH INSULATED CHAMBERS

(71) Applicant: Kenneth W. Cowans, Fullerton, CA (US)

(72) Inventor: Kenneth W. Cowans, Fullerton, CA (US)

( * ) Notice: Subject to any disclaimer, the term of this patent is extended or adjusted under 35 U.S.C. 154(b) by 0 days.

(21) Appl. No.: 14/779,061

(22) PCT Filed: Apr. 8, 2014

(86) PCT No.: PCT/US2014/033293
§ 371 (c)(1),
(2) Date: Sep. 22, 2015

(87) PCT Pub. No.: WO2014/168927
PCT Pub. Date: Oct. 16, 2014

(65) Prior Publication Data
US 2016/0053669 A1    Feb. 25, 2016

Related U.S. Application Data

(60) Provisional application No. 61/809,525, filed on Apr. 8, 2013.

(51) Int. Cl.
| | |
|---|---|
| *F02D 15/04* | (2006.01) |
| *F02B 37/04* | (2006.01) |
| *F16L 37/26* | (2006.01) |
| *F02B 37/10* | (2006.01) |
| *F02B 37/12* | (2006.01) |
| *F02B 19/06* | (2006.01) |
| *F02B 75/04* | (2006.01) |
| *F02B 77/11* | (2006.01) |

(Continued)

(52) U.S. Cl.
CPC .............. *F02B 37/04* (2013.01); *F02B 1/12* (2013.01); *F02B 5/02* (2013.01); *F02B 19/06* (2013.01); *F02B 19/12* (2013.01); *F02B 33/40* (2013.01); *F02B 37/10* (2013.01); *F02B 37/12* (2013.01); *F02B 37/16* (2013.01); *F02B 39/10* (2013.01); *F02B 75/02* (2013.01); *F02B 75/04* (2013.01); *F02B 75/042* (2013.01); *F02B 77/11* (2013.01); *F02D 15/04* (2013.01); *F02M 35/10157* (2013.01); *F16L 37/26* (2013.01); *F02B 2019/006* (2013.01)

(58) Field of Classification Search
CPC .. F02D 15/04; F02B 19/06; F02B 2019/006; F02B 2019/008; F02B 75/042
See application file for complete search history.

(56) References Cited

U.S. PATENT DOCUMENTS

| | | |
|---|---|---|
| 1,719,215 A | 7/1929 | Faroy et al. |
| 4,004,421 A | 1/1977 | Cowans |

(Continued)

FOREIGN PATENT DOCUMENTS

WO    03/016701 A1    2/2003

OTHER PUBLICATIONS

International Search Report of PCT/US2014/033293.
(Continued)

*Primary Examiner* — Erick Solis
(74) *Attorney, Agent, or Firm* — Mattingly & Malur, PC

(57) ABSTRACT

One of the two combustion chambers of an internal combustion engine using variable compression ratio and fuel charge, VCRC engine, is improved. These improvements involve adding another, second combustion chamber for mixing products of the first combustion with engine air and refining the insulation of engine heat in the engine process.

17 Claims, 8 Drawing Sheets

(51) Int. Cl.
  *F02B 5/02* (2006.01)
  *F02B 19/12* (2006.01)
  *F02B 1/12* (2006.01)
  *F02B 33/40* (2006.01)
  *F02B 37/16* (2006.01)
  *F02B 39/10* (2006.01)
  *F02B 75/02* (2006.01)
  *F02M 35/10* (2006.01)
  *F02B 19/00* (2006.01)

(56) References Cited

U.S. PATENT DOCUMENTS

| | | | | |
|---|---|---|---|---|
| 4,122,805 A * | 10/1978 | Kingsbury | ............. | F02B 19/14 123/193.5 |
| 4,254,621 A | 3/1981 | Nagumo | | |
| 4,453,527 A * | 6/1984 | Wade | ............. | F02B 19/14 123/193.3 |
| 4,651,703 A * | 3/1987 | Hoppie | ............. | F02B 19/06 123/48 D |
| 4,715,347 A * | 12/1987 | Hampton | ............. | F02B 19/06 123/48 D |
| 4,738,227 A * | 4/1988 | Kamo | ............. | F02B 9/04 123/23 |
| 5,033,427 A | 7/1991 | Kawamura et al. | | |
| 5,277,159 A | 1/1994 | Webster | | |
| 6,422,008 B2 | 7/2002 | Voss et al. | | |
| 6,427,643 B1 * | 8/2002 | Dixon | ............. | F02B 19/06 123/48 A |
| 6,606,970 B2 | 8/2003 | Patton | | |
| 6,708,654 B2 | 3/2004 | Cowans | | |
| 6,814,064 B2 | 11/2004 | Cowans | | |
| 7,762,055 B2 | 7/2010 | Hoffman et al. | | |
| 2003/0017086 A1 | 1/2003 | Bruck et al. | | |
| 2011/0303186 A1 * | 12/2011 | Sergeev | ............. | F02B 19/06 123/285 |

OTHER PUBLICATIONS

Ricardo, Harry R., The High Speed Internal Combustion Engine, Fourth Edition, Blackie & Son, Ltd., 1967, referred to hereafter as Ricardo (p. 106 and 107 re. the Mark III chamber).
Stephenson, R. Rhoada, Should We Have a New Engine? Jet Propulsion Laboratory, California Institute of Technology, 1975: referred to hereafter as Stephenson, in Fig. 4-9, pp. 4-48.
The Hottel chart in McAdams, W.H., Heat Transmission, Third Edition, McGraw-Hill Book Company, Inc., New York, 1954; referred to hereafter as McAdams, p. 38.

\* cited by examiner

VCRC ENGINE WITH INSULATED CHAMBERS

CROSS REFERENCE TO RELATED APPLICATIONS

This application is the U.S. national phase, under 35 U.S.C. §371, of PCT/US2014/033293, filed Apr. 8, 2014, published as WO2014/168927 A1 and A4 on Oct. 16, 2014 and claims priority to U.S. Patent Application No. 61/809,525, filed Apr. 8, 2013, the disclosures of which are expressly incorporated herein by reference.

BACKGROUND OF THE INVENTION

Systems and methods in accordance with the invention deliver increased efficiency when used with a VCRC engine such as is disclosed in U.S. Pat. No. 6,708,654. Especially advantageous are the realizations applied to the engine in passenger car or light truck use. The value realized is increased efficiency at low power at moderate speeds. This is the average mission for all passenger vehicles and most light trucks. A major objective of the invention is to enhance the efficiency of the VCRC prime mover engine as a device to derive mechanical energy from the heat energy of a burning fuel, with higher efficiency in a lighter weight and smaller configuration than has heretofore been the case; particularly at power demands far less than the engine's maximum. A particular use for this engine is for automobile power. In this application, efficiency at low engine torque at moderate speeds is of prime interest since most of the time an engine used in a passenger automobile operates at approximately 10% or less of its maximum power output at moderate speeds-typically 1,500 to 3,000 revolutions per minute (rpm).

BRIEF SUMMARY OF THE INVENTION

This disclosure presents several realizations. All these impede the flow of heat from the VCRC engine. They are applied to surfaces associated with the pre-chamber 214, transfer passage 202 and main cylinder volume 204. In addition to the task of impeding the flow of heat energy from engine 227 they aid in the combining of fuel with air. The insulation is done to increase the overall thermal efficiency of the engine. The exemplifications also enhance secondary mixing and combustion in the VCRC engine. To quote from U.S. Pat. No. 6,708,654; "In the final time of the firing phase substantially all of the fuel in working volume is combined with oxygen." Realizations presented herein enhance this process of combining fuel and oxygen in the cylinder air in the 'final time of the firing phase'. The exemplifications can find useful application to other engines as well.

Thorough mixing after initial combustion is accomplished in compression ignition (CI) engines by a mechanism created by Ricardo, Harry R., *The High Speed Internal Combustion Engine*, Fourth Edition, Blackie & Son, Ltd., 1967, referred to hereafter as Ricardo (p. 106 and 107 re. the Mark III chamber). An isolated, modified version of Ricardo's Mk III mixing chamber is shown in FIG. 3 as referred to on FIG. 2 as component 211. The modified Mk III 211 is insulated from the engine block as noted in FIG. 2 by insulation 210.

Figure 4:
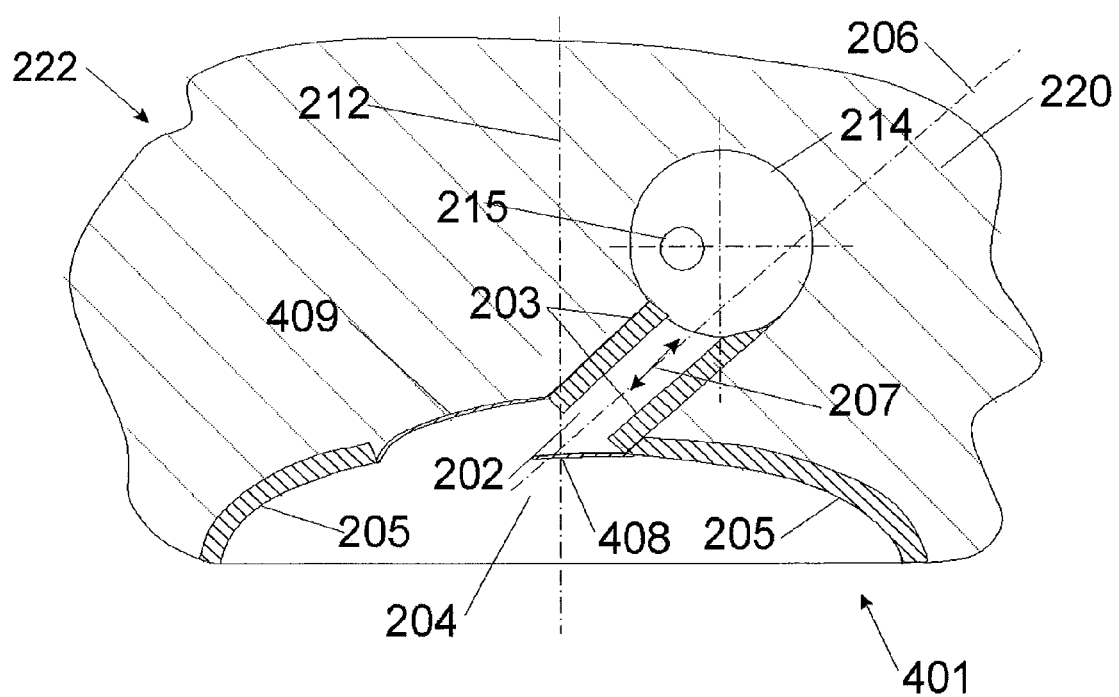

FIG. 4 is a detail of an exemplification of one way to effect isolation of the mixing chamber following IBV 214.

Figure 5:
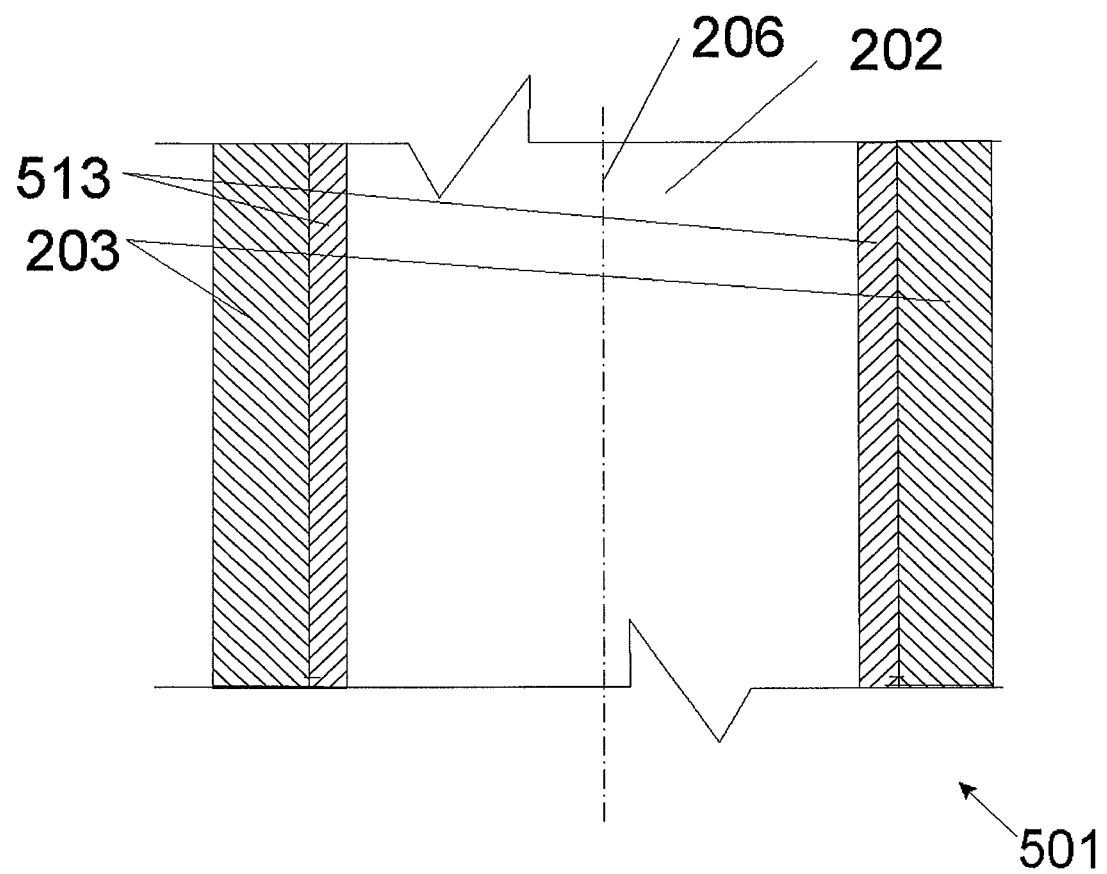

FIG. 5 shows an exemplification illustrating how an integrating layer 513 can be placed on an insulation 203 which insulation 203 typically displays a low thermal mass per unit volume.

Figure 6:
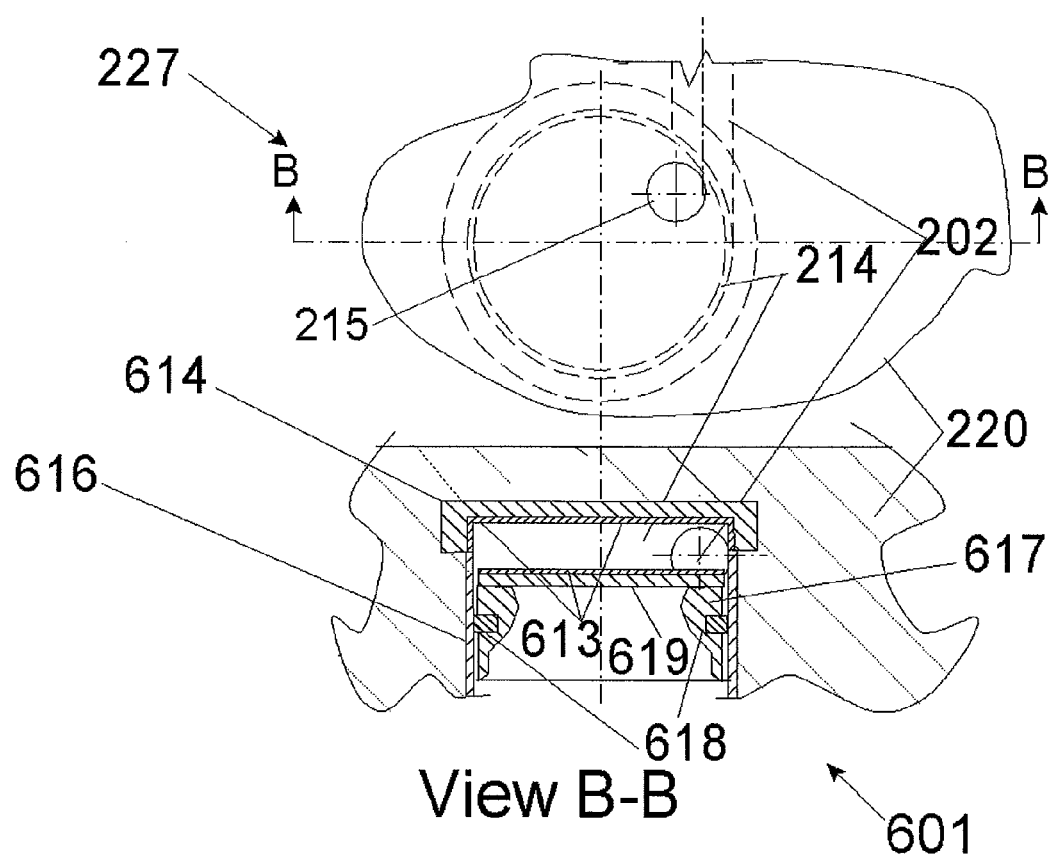

FIG. 6 depicts a realization that can thoroughly insulate IBV 214.

Figure 7:
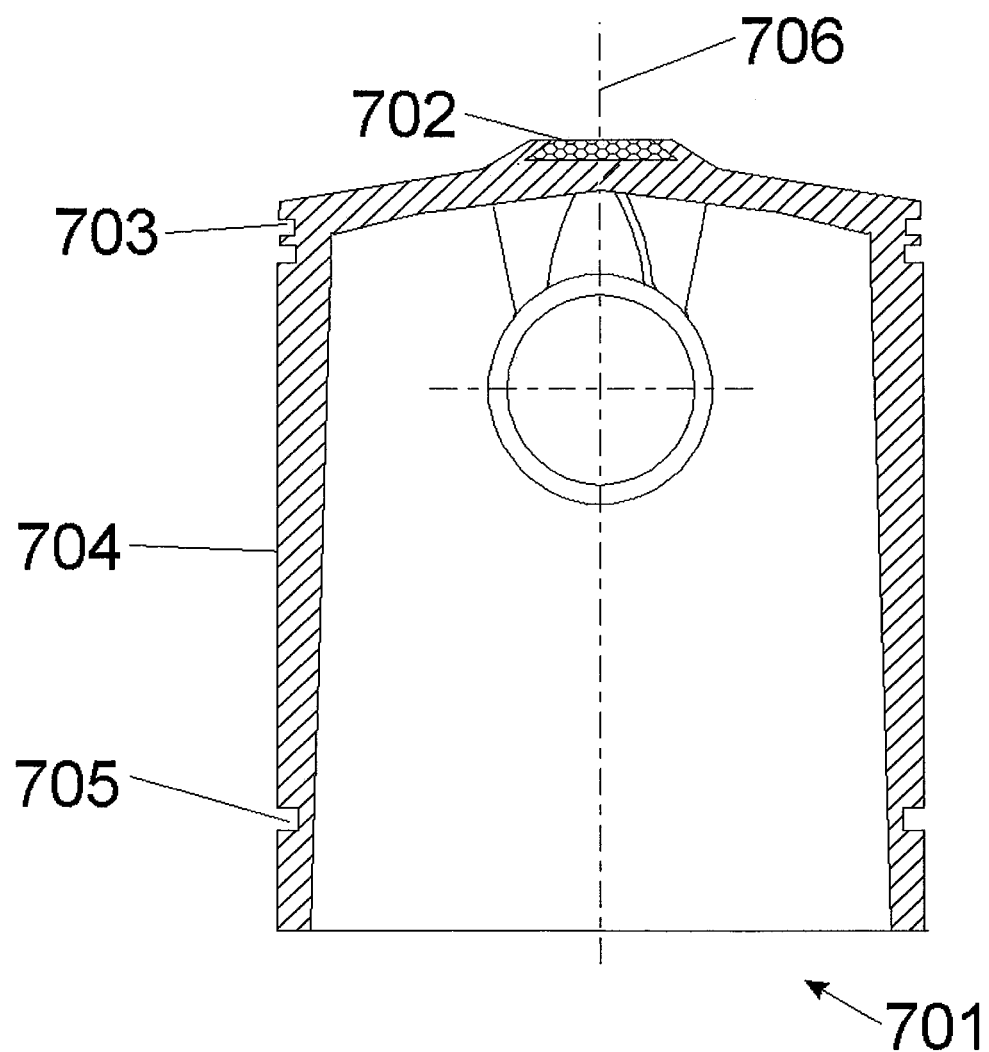

FIG. 7 shows a cross-section detail of a piston 704 suitable for use in VCRC engine 227 with an insulator insert 702 on top of piston 704.

Figure 8:
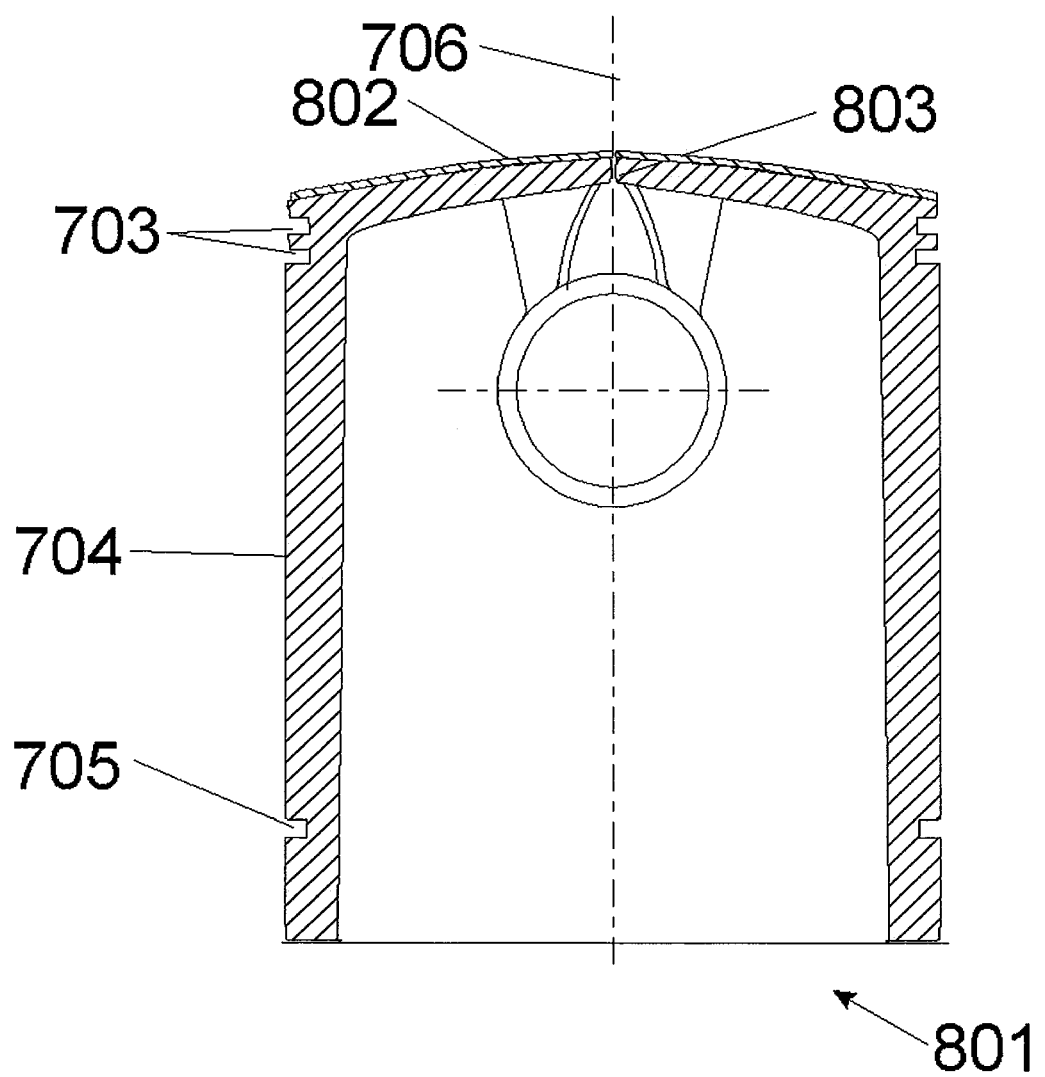

FIG. 8 illustrates another solution to a piston system 801 suitable for use in the VCRC engine 227 with an insulated sheet metal top 802.

DETAILED DESCRIPTION OF THE INVENTION

Overall Realization

Figure 1:
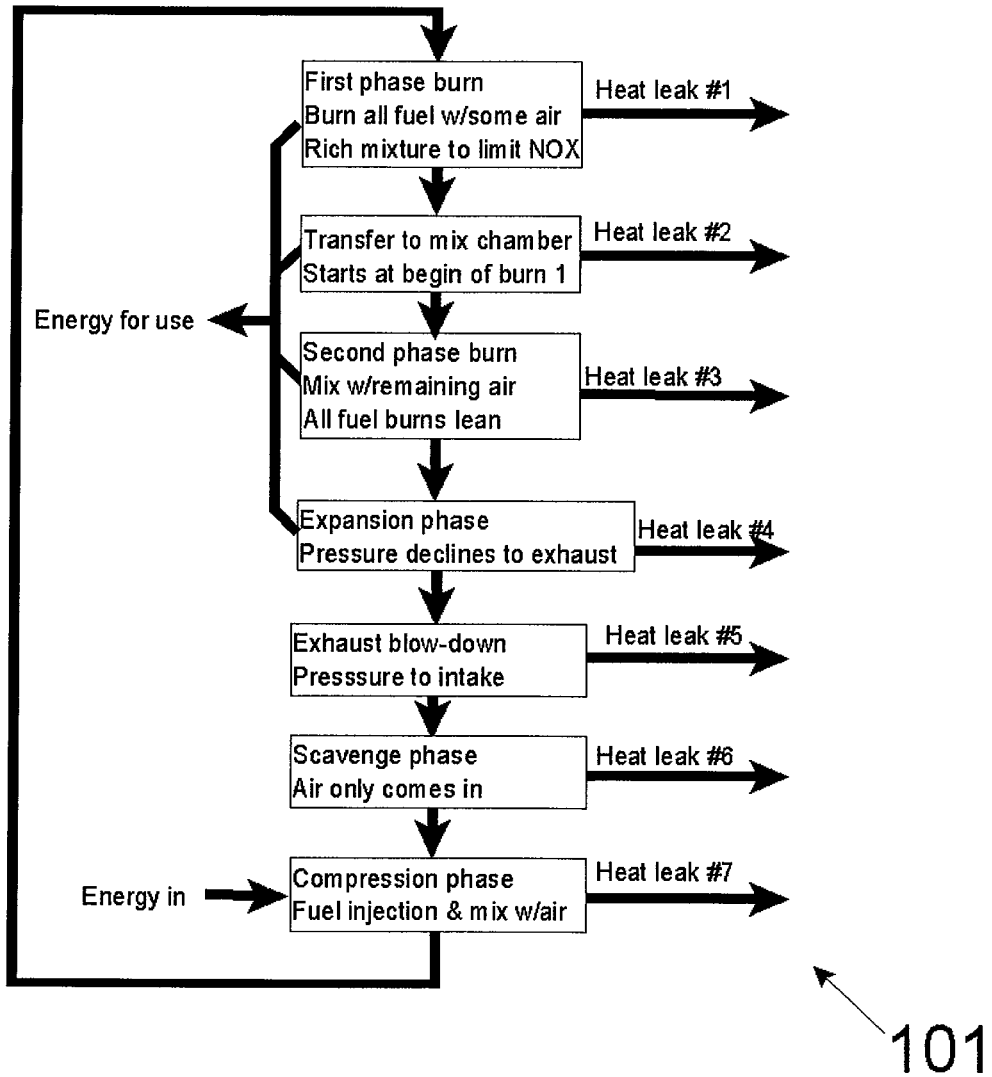
FIG. 1 is a block diagram of the VCRC engine process (system 101) pointing out particularized heat leaks in said engine 227.

FIG. 1 shows how heat leaks can be assigned to various processes in VCRC engine 222. These are complex but most can be overcome or have been tested as acceptable.

Heat Leak #1; First Phase Burn

Heat leak #1 is that between the first burn mixture and the surfaces defining the IBV 214. This leak is most significant at idle since the proportion of heat leak to total heat of burning is inversely proportional to flow rate and dimensions of IBV 214. Heat fraction that is lost typically varies as the $-0.2$ power of the flow rate times the smallest dimension of flow. This is if static insulation is not added to the internal surfaces. The total barrier to heat lost is the heat transfer coefficient of the flow. Within any IC engine the flow is inevitably turbulent in small volumes due to inherent disturbance of the flow.

Early in VCRC development, efficiency at idle was measured because of this certain relationship between low power and significance of heat leak. Average thermal efficiency measured was 20% to 40% at idle. Mean effective pressure (MEP) was about 10 and 20 psi respectively. This indicated that the insulation afforded by heat transfer coefficient was adequate for IBV 214. This is true since a typical SI engine displays an efficiency ca. 10%. Adequate is the appropriate word. Adding static insulation could easily add to these measured efficiencies in the VCRC engine.

Adding a static insulation to the internal surfaces of IBV 214 must be done carefully. It is all too easy to create a situation leading to preignition if such addition is done in error. Combustion temperatures (ca. 2000° C. and more) are attained in IBV 214. This can result in more than preignition temperatures being imposed on insulation surfaces. This is particularly true if the insulation has a low specific heat per unit volume. Most good insulators show this characteristic. The realization discussed in system 501 and 601 should be carefully considered.

Heat Leak #2; Transfer to Mix Chamber

This transfer begins immediately after the burn in IBV 214 begins. Sharp pressure rise that accompanies such a burn pushes exhaust products back through passage 202. In the reverse flow 207 to MV 204, the gas is hot. Heat thus flows to engine block 222; a loss to the engine process. Since that flow is at high velocity, the resultant heat transfer is concomitantly high. Insulation 203 is useful in reducing this loss. Preignition is a possibility in passage 202, particularly at the end nearest IBV 214. This should be guarded against with the realization discussed in systems 501 and 601.

Heat Leak #3; Transfer Out of Phase 2 Burn

Heat leak #3 can prevent the second phase of burning. This burn combines exhaust from IBV 214 with air remaining in the engine, for a lean burn. If the mix after heat leak #2 is too cold, the burn will cease. Also, if walls surrounding mixing chamber are too cool, fuel may condense out. The fix is to insulate any mixing chamber, i.e. chamber 211.

Heat Leak #4; Expansion Phase Pressure Declines to Exhaust

This heat leak is of little import. The temperature of the flow out of the mixing chamber is low. The heat transfer coefficient is also relatively small. The result is that only a little heat of process is lost here. The loss can be minimized by insulating both cylinder top 205 and piston top (702 or 802).

Heat Leak #5, 6 and 7; Exhaust Blowdown, Scavenge and Compression

All of the leaks #5, 6 and 7 have little effect on the engine process. A leak during compression (#7) can even be salutary to thermal efficiency. Power outside engine process may be affected but that is not this subject.

Insulation Around Passage 202

Figure 2:
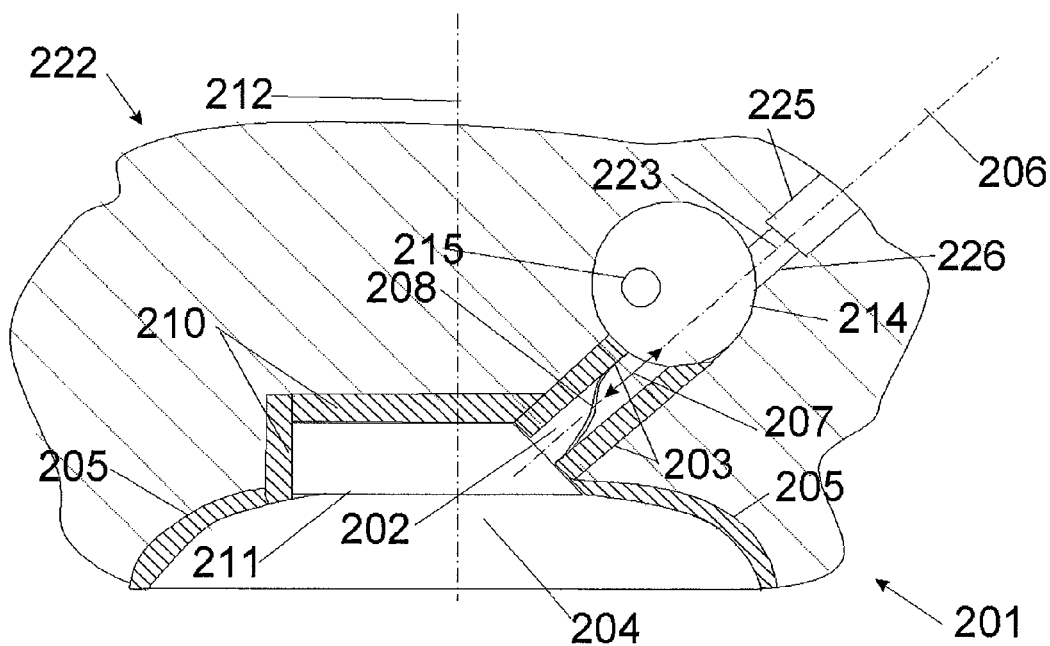
FIG. 2 is a cross-sectional view of the main realization through the center line 206 of passage 202. This shows system 201. Passage 202 connects between the initial burn volume (IBV) 214 and the main cylinder volume (MV) 204. Passage 202 is insulated from engine block 222 by insulation 203 along substantially the entire length of passage 202.
Figure 3:
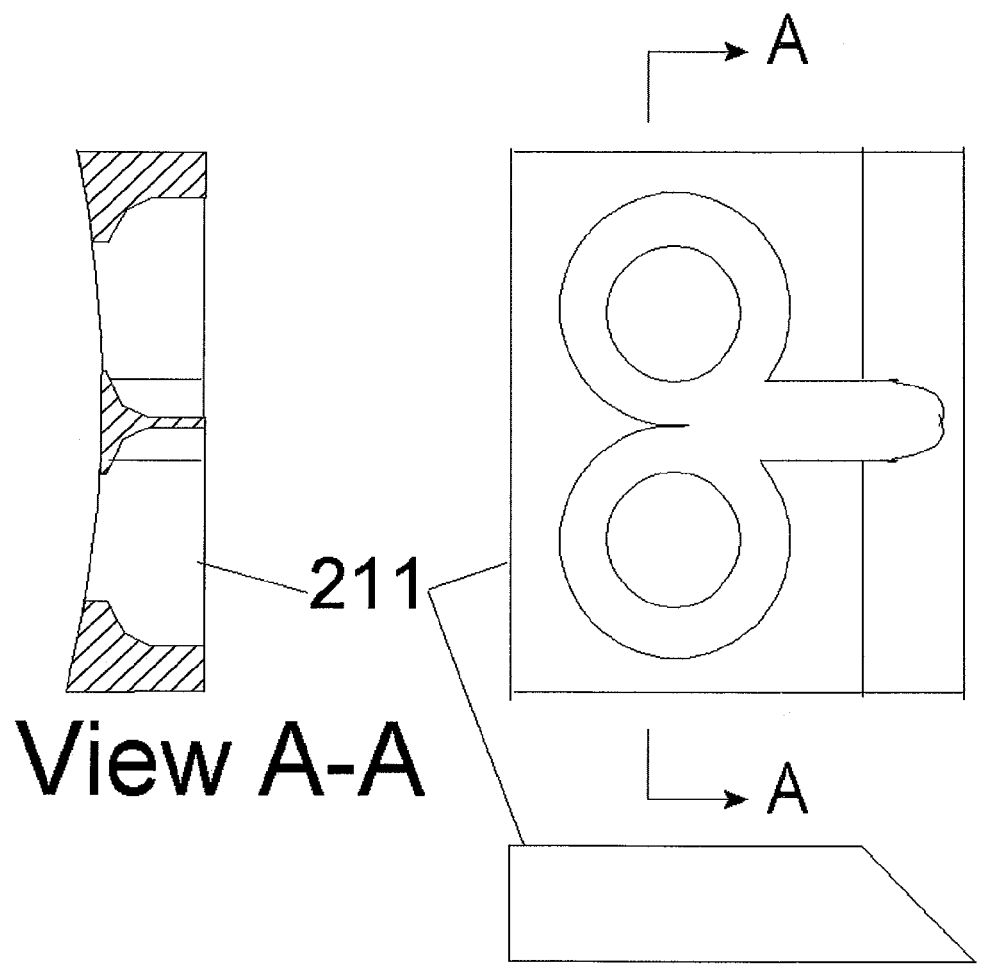

FIG. 2 shows insulation 203 surrounding passage 202. This is a cross-sectional view of a VCRC engine through centerline 206 of passage 202. It shows a realization of the concept presented herein. This drawing shows IBV 214 connected to MV 204 through passage 202. Passage 202 is generally round as indicated by centerline 206. Passage 202 is isolated with insulation 203 surrounding passage 202. Refinement of such insulation is discussed in system 501. Flow 207 is substantially air going to IBV 214 from MV 204 and hot exhaust gas returning. Between IBV 214 and MV 204 exhaust gas goes through insert 211. Insert 211 is shaped inside, as shown in FIG. 3, similar to the 'Mark III' described in Ricardo; p. 106 and 107. Insert 211, as shown in FIG. 1, is lagged by insulation 210. FIG. 1 also shows a hole 215 tapped for a spark plug. The top of the engine cylinder 205 is also outlined as insulated. Centerline 212 indicates location of the cylinder.

Insulated Mixing Chamber Introduced

The significant component in the realization of FIG. 2 is the mixing chamber fabricated within insert 211. Development testing on the VCRC has shown the need for this chamber. The first testing on the VCRC engine was at 600 rpm with output of 0.5-1.0 horsepower (HP). A 30 cubic inch 2 stroke cycle cylinder was the test subject. The testing was to evaluate the significance of heat loss on thermal efficiency. Testing at the lowest power of idle places any heat loss as more significant to overall efficiency. This is due to basic heat transfer relationships.

h, the heat transfer coefficient, is defined by the basic heat transfer equation:

$$Q/S = h\delta T \text{ where;}$$

Q is the amount of heat transferred per unit time per area S of wall, $\delta T$ is the temperature difference between wall and flow of fluid transferring heat to or from the wall.

h is generally proportional to the mass velocity raised to the 0.8 power;

$h \sim (\text{Reynolds number, RN})^{0.8}$. This is for turbulent flow, which is nearly unavoidable inside any internal combustion (IC) engine. This implies that the heat lost inside an IC engine as a percentage of the whole heat burnt has an inverse relationship to the total heat. This result comes from elementary heat transfer calculations. Any velocity inside an IC engine that resulted in laminar flow, however unusual, would result in a higher percentage lost at lowest power.

Initial Tests with VCRC Idle

As noted above; the initial test results were excellent. Thermal efficiency at an idle of about 600 rpm was measured at >20%@0.5 HP to about 40%@1.0 HP Typical values are around 7%-12% for a modern SI engine. Thermal efficiency is the mechanical power generated divided by the heat in the fuel consumed. It is assumed the fuel supplied is burned completely.

Need for Mixing After Initial Burn Shown in Test

The good results of the tests obscured several lacks that subsequent development brought out. Low power tests each used only a little fuel. Mixing fuel and air for the first burn, therefore, was simple to effect. Equally, the "final time of the firing phase", to quote the original VCRC patent, involved a minute amount of fuel and copious amounts of air. The second phase of burning was easy to accomplish.

Several unsuccessful tests of mixing attempts to effect the second burn phase at moderate to high power followed. This illustrated the need for further study and a new approach. Ricardo's Mark III approach was examined and variations of it tried without success, Differences Between CI and VCRC Final Burning A detailed study of the success and limitations of the Mark III was undertaken. The differences between the original CI engines using Ricardo's device and the basic VCRC functions were elucidated.
  1. The application of the Mark III to the basic CI engine only mixed with fuel loads over 50-60%/power-cycle: Heat load in mixing chamber is thus always high. Amount of fuel to be reduced in the Mark III is also small.
  2. Initial combustion and high air temperature in CI engines is assured by very high compression ratio (CR).
  3. High mass flows out of initial combustion always exist.
VCRC final combustion problem;
  1. At various throttle settings, fuel (and air) loads go from about <15% per power-cycle at idle to 100% per power-cycle at full torque. Total flow, proportional to speed, thus varies even more.

2. Initial combustion requires rich uniform mixture of gaseous fuel and air. CR varies but is always too low to assure combustion. At high power the CR is deliberately low.
3. Mass flow from initial combustion varies up to 6 fold per cycle.

The result is clear. VCRC final combustion must be insulated to ensure that combustion continues to completion. Conventional CI final mixing is always at high power and flow. VCRC final mixing has variable flow and power with low CR at high power. Insulation around final burning is needed to ensure this is hot enough to continue to completion. In VCRC, this occurs with moderate fuel flows that are more than the minimum.

Parameters of VCRC Engine Operation

The operation of the variable compression ratio and charge engine (VCRC ref. U.S. Pat. No. 6,708,654) depends on a charge entering IBV 214 (component 52 on the original U.S. Pat. No. 6,708,654) that is uniformly mixed. The charge consists of all the fuel for one firing of the engine cylinder and some of the cylinder's air. The charge is significantly richer (typically >40%) than stoichiometric. This is to suppress creation of oxides of nitrogen (NOX), a pollutant. Fuel within the charge is gaseous in form and substantially uniformly mixed with air in the charge. This condition is aided if the charge is hot. Energy added to the charge during compression should not excessively leak to the surroundings. If the air is hot the fuel will exist in gaseous form. This fuel will mix with the air in a substantially uniform manner. Usually flow 207 into IBV 214 is turbulent. This helps uniform mixing. It is useful for the VCRC to insulate the mixture as it flows into IBV 214. This flow occurs during the compression phase of the VCRC engine.

Initial Combustion in the IBV

It is important for the fuel/air mixture entering into the IBV 214 to be both significantly richer than stoichiometric and substantially uniformly mixed. The first requirement is needed to suppress the formation of NOX. Stephenson, R. Rhoada, *Should We Have a New Engine*? Jet Propulsion Laboratory, California Institute of Technology, 1975: referred to hereafter as Stephenson, in FIG. 4-9, pp. 4-48, shows that a mixture 40% or more rich than stoichiometric will produce substantially vanishingly small percentages of NOX. A uniform mix will not result in particulates forming in the combustion process. The result is more efficiency and less polluting if the air retains most of the heat of compression.

Conventional CI vs. VCRC Engine

Ricardo in p. 102 to 107 discusses at some length the application of heat-insulated members to CI or, in popular vernacular, diesel engines. In such engines, the sole purpose of the insulated members is to enhance the efficiency by not requiring too high a CR. In CI engines CR is determined by the minimum CR needed for cold starting. High CR results in high friction during engine operation. Ricardo, in p. 152 and 153, shows that an optimum CR exists for any engine based on its mission requirements. This is in contrast to the popular belief that a higher CR always increases efficiency. CI combustion requires that the air, after compression, be at a high enough temperature. This results in rapid combustion following fuel injection. Any form of uniform mixing is anathema to the quiet reliable operation of the conventional CI engine. It is well known in the art that any substantial vaporization of fuel prior to combustion in conventional CI engines will give rise to noise and possible engine deterioration.

The VCRC engine, an SI engine, on the other hand, bases its performance characteristics on combusting a uniform mixture. This minimizes production of particulates. Combustion needs to progress at an optimum rate as is well known. The use of insulation in passage 202 is thus used for a totally different purpose than in the CI engine. CR in the VCRC engine is maintained close to optimum throughout its operating range. It varies from about 10:1 (mechanical CR) at full torque to about 17:1 at idle torque. A mechanical CR considers the entire cylinder displacement. In practical terms, all engines have valve timing that lowers the mechanical CR. Actual CR varies with momentum in airflow, thus rpm. During the initial mixing operation, it is imperative to not allow condensation of liquid fuel on the walls of passage 202. Condensation is forestalled by the wall surrounding passage 202 being substantially hotter than the engine block 222 if insulation 203 is used as per FIG. 2.

An exemplification of insulation installation is illustrated in FIG. 2. This uses insulation 203 surrounding the passage 202 from MV 204 to IBV 214. The heat imparted to the flow 207 as it moves from MV 204 to IBV 214 is insulated from the engine block 222.

Function of High Density Wall 513

It is important in the VCRC engine to not have the surface contacting the fuel-air mixture become too hot. If a too high temperature is obtained, preignition can result. A configuration to minimize high insulation surface temperature is addressed in FIG. 5.

Typically, the high temperature insulation 203 of FIG. 2 would be made of closed cell stainless steel ((SS) foam or other material that had a thermal expansivity close to that of aluminum and enough strength to withstand the variation in pressure within the engine (typically around 2,000 psi or less) as well as the ability to withstand the high temperatures involved.

As mentioned above, there is the possibility that the hot surface of the high temperature insulation in FIG. 2 could get too hot. The heat transfer from the hot exhaust gas could heat the surface excessively. This is due to the low specific heat per unit volume of good insulators. This can result in a runaway fault if the surface temperature exceeds the ignition temperature of the fuel used. The configuration shown in FIG. 5 can be used to circumvent this phenomenon. A solid wall 513 on insulation 203 can eliminate the basic problem of too low specific heat per unit volume on the surface of insulator 203. Wall 513 does not affect the average performance of insulator 203. It does, however, present a surface having a high specific heat per unit volume to the flow; high enough to prevent the transient flash heat of combustion resulting in ignition temperature at the surface.

Thickness of wall 513 need not be large. The time of exposure to high combustion temperature is short, typically about 0.001 seconds. This means a wall 513 of 0.010 inches thick would be more than adequate. A vacuum plating of nickel, for example, would suffice. The Hottel chart in McAdams, W. H., *Heat Transmission, Third Edition*, McGraw-Hill Book Company, Inc., New York, 1954; referred to hereafter as McAdams, p. 38 can be used for calculation.

Final Phase Combustion Considerations

Final combustion is aided by the hot dome of the piston (either 702 or 802 in this disclosure) in the MV 204 being the first surface encountered by the hot blast from the pre-chamber. It has been shown in development tests that the VCRC engine works better when the blast of hot gas out from the IBV 214 contacts a hot surface that is elevated in temperature. The piston in the MV 204 can provide the hot surface. It is also possible to provide other surfaces as, for example, those shown in FIGS. 2, 3 and 4. The surfaces shown in FIG. 4, showing system 401, are illustrative. Shown are isolated sheet metal surfaces 408 and 409. These show how, together with a hot top of the engine's piston (702 or 802), a secondary mixing chamber can be created. A small air gap ≈0.010 cm. or 0.004 inches would be sufficient to substantially insulate plate 409. Sheet metal plate 408 is shown as completely isolated. Therefore, plate 408 is adequately insulated.

A detail of the modified insert 211 is shown on FIG. 3. The insert is fabricated of a material such as austenitic SS. This material has about the same thermal expansivity as aluminum, which is the material typically used for engine blocks. As noted on FIG. 2, the insert is insulated from the engine block. This insulation could be fabricated of mica or closed cell SS foam. Alternatively, a small gap between the insert and the engine block can serve as the insulator. If mixing chamber 211 is fabricated of an insulator, insulation 210 is not needed.

Initial Vaporization and Mixing Fuel with Air

The problem that can best be called carburetion, uniformly mixing air and fuel in a gaseous and combustible manner, can be difficult in the VCRC engine. CI engines have developed consistent and reliable injectors but these have a strong characteristic called penetration, the ability to present an injected stream that travels, or penetrates, far into the air of an engine. This is needed in the CI engine as the fuel must mix with the air very fast, typically in 15° of crankshaft travel. Injectors intended to inject into a large volume, as used in direct injected SI engines, also have high penetration.

The VCRC engine has the problem of injecting into a small volume wherein limited penetration is needed. If any fuel escapes from the IBV 214, it will probably not enter into the proper VCRC combustion process. Developmental tests have shown that often any fuel that so escapes out of the passage connecting the IBV 214 to the MV 204 condenses on the cylinder walls and is lost completely from the combustion process.

The Hot Twister

FIG. 2 shows an IBV 214 with a device inserted into the passage 202 leading to MV 204. This is a twisted sheet metal component called a hot twister (HT) 208. HT 208 is twisted over 180° or more. In this manner, HT 208 will intercept any injected fuel sprayed along the centerline 206 of passage 202. The center-line 206 is shown as coincident with the center-line of the injector nozzle 225. Injector nozzle 225 injects fuel to engine 222 through injector bore 226. Cylinder centerline 212 is of the cylinder shown of the engine 227.

HT 208 component has been developed to ensure that fuel emerging from the injector is intercepted and is vaporized when injected into passage 202 from IBV 214 to MV 204 and then is mixed with air passing through passage 202 during the compression phase.

Such a component is shown in FIG. 2. As may be seen there, HT 208 is inserted into the passage 202 between IBV 214 and MV 204. HT 208 consists of a length of sheet metal formed to a width substantially equal to the inside diameter of passage 202. HT 208 is twisted over 180° or more. In this manner, HT 208 will intercept any injected fuel sprayed with a velocity profile along the centerline of passage 202. The thermal contact of HT 208 with engine block 222 is such that HT 208 will quickly come to a temperature of about 500° C. during operation; in between that of peak combustion and ambient temperature. HT 208 will thus vaporize any sprayed fuel that it intercepts. HT 208 can also be heated by electrical means to aid in cold starting.

The design of HT 208 lends itself to an assembly that is efficient, reliable and easy to service. If HT 208 is electrically heated and aligned with the centerline of the injector, it is possible to make injector 225, electrical heater and HT 208 as an installable assembly that can be removed for service. This is needed because electrical heaters can fail.

Closed-Cell Stainless Steel Foam

Closed-cell stainless steel foam is available. It is a relatively new and high-priced material but one whose cost will come down with quantity fabricated. It can be used extensively in the VCRC engine. The material is light, stiff and strong. It also has a thermal conductivity approaching that of plastics (ca. $10^{-3}$ watts·cm.$^{-1}$C.$°$ $^{-1}$). This kind of foam can be used in the VCRC engine as an insulator. It can also serve wherever a thermal insulator can be used as a structural component; for example mixing chamber 211. It has the advantage of being able to withstand temperatures well over 1000° F.

Thermal Integration to Prevent Preignition

The insulating qualities of SS foam can alternatively be combined with a wall 513 having a high thermal mass per unit volume. This wall 513 could be thermally accessible to the fluid passing by the wall as shown in FIG. 5.

The wall 513 of FIG. 5 can be of a thickness defined by the heat capacity accessibility as needed by the VCRC engine. Its thickness and its thermal parameters can be defined by a Hottel chart; an example of which can be found in McAdams on p. 38. A sample calculation is included following.

The wall 513 is found in the thermal integration wall 513 can afford. The thermal diffusivity (defined in a subsequent paragraph) of foam insulation is so low that, combined with the extremely low thermal mass per unit volume of the foam insulation, its surface temperature can be high enough after the blast of hot exhaust from the IBV 214 to be above the temperature of preignition with common hydrocarbon fuels (typically >850° C.). The use of the wall 513 can, with appropriate thermal design by one skilled in the art, forestall such possibility of temperature of preignition.

It should be noted that preignition can only occur where unburned fuel is present. This is in volumes such as within IBV 214.

Example of Thickness Calculation

Calculating thickness of wall 513 value thus:
t (approximate thickness)=$(\alpha\theta)^{-1/2}$; where:

$\alpha$ = thermal diffusivity of wall material

= $k/\rho C_p$;

k=thermal conductivity of wall material, ≈
$\rho$=density of wall material,
$C_p$=heat capacity of wall material,
$\theta$=time of process (of the order of $10^{-3}$ seconds for typical automotive engines including the VCRC).
∴ thickness≈$10^{-2}$ cm (≈0.004").

Importance of Insulation in Low Output Heat Engines

It is desirable to minimize heat leak from any prime mover. This factor is exceedingly important in engines in passenger vehicles since these engines perform most of their lives at very low power outputs; low, that is, compared to their peak power output. Any heat leak will thus be a high percentage of the total average output. The VCRC concept demands that a piston slides in the IBV 214, thereby changing the volume of the initial combustion. An assembly as disclosed in FIG. 6 might be advantageous in a VCRC engine.

It may be seen in FIG. 6 that a high degree of insulation is provided to the IBV 214 at small values of IBV 214. The insulation noted on FIG. 6 serves to isolate the heat of combustion in IBV 214 from the engine block 222, as can be seen on FIG. 6. The insulated top 619 for the auxiliary piston 617 isolates heat from engine block 222. Insulation covers substantially the entire periphery of the IBV 214 at the minimum operating value of that volume. Insulation 614 covers the volume above piston 617 when piston 617 is at minimum volume of IBV 214. The piston ring(s) 618 on auxiliary piston 617 stay(s) running on the steel shell 616 noted on FIG. 6 which is in contact with engine block 222. Piston ring(s) 618, then, can remain lubricated with conventional oils.

Heat Leak #1 Re. Hot Top on Piston

FIGS. 7 & 8 show two methods of creating a hot surface atop the piston 704. Insert 702 accomplishes the purpose of completing hot surfaces around the second mixing chamber. Sheet metal top 802 accomplishes the same objective. Both are created for the purpose of aiding the second phase burn.

While preferred embodiments of a VCRC engine with insulated chambers, in accordance with the subject invention, have been set forth fully and completely hereinabove, it will be apparent to one of skill in the art that various changes could be made to the subject invention, without departing from the true spirit and scope of the subject invention which is accordingly to be limited only by the appended claims.

I claim:
1. A spark ignition internal combustion engine comprising:
   a piston/cylinder assembly in which output torque is controlled by control of fuel delivery, and pollutants are minimized while efficiency is enhanced by sequential combustion sequences starting in an auxiliary, cyclically varying expansion volume including a device to initiate ignition of a mixture of fuel and air in a first phase of combustion, with the mixture being sufficiently richer than stoichiometric to suppress the formation of oxides of nitrogen, said auxiliary, cyclically varying expansion volume containing substantially all the fuel to be burned in one cycle together with only some of the air to be burned in one cycle;
   an intermediate chamber between said auxiliary cyclically varying expansion volume and the interior of said cylinder of said piston/cylinder assembly, such that within said intermediate chamber all said fuel which was unburned during said first phase of combustion in said auxiliary, cyclically varying expansion volume is substantially completely combined with oxygen prior to entering said interior of said cylinder, and
   insulation substantially surrounding said auxiliary, cyclically varying expansion volume, surrounding a passageway between said auxiliary, cyclically varying expansion volume and said intermediate chamber and surrounding said cylinder of said piston/cylinder assembly, said insulation serving to isolate a flow in said passageway from a block of said internal combustion engine, said insulation being covered with a layer of solid material, said layer of solid material being interposed between said insulation and said flow in said passageway.

2. The engine as set forth in claim 1 in which said layer of solid material is of sufficient thickness to integrate thermal heating of the beginning of said first phase of combustion to such a degree that a surface temperature of said layer of solid material does not exceed a pre-ignition temperature of fuel and air in said passageway.

3. The engine as set forth in claim 1 in which said insulation is fabricated of closed cell metal foam.

4. The engine as set forth in claim 1 in which said insulation is fabricated of closed cell ceramic foam.

5. The engine as set forth in claim 2 including a twisted sheet metal within said passageway between said auxiliary, cyclically varying expansion volume and said intermediate chamber.

6. The engine as set forth in claim 5 in which said twisted sheet metal is positioned to intercept all the fuel injected to said engine.

7. The engine as set forth in claim 6 in which said twisted sheet metal is twisted continuously around a centerline of said passageway between said auxiliary cyclically varying expansion volume and said intermediate chamber.

8. The engine as set forth in claim 7 in which said centerline of said twisted sheet metal is coincident with a centerline of a fuel injector of said engine.

9. The engine as set forth in claim 6 in which said centerline of said twisted sheet metal is coincident with the centerline of the fuel injector of said engine and further includes an electric heater combined with said twisted sheet metal.

10. The engine as set forth in claim 9 in which said twisted sheet metal, said fuel injector and said electric heater are combined into one component.

11. A spark ignition internal combustion engine comprising:
   a piston/cylinder assembly in which output torque is controlled by control of fuel delivery, and pollutants are minimized while efficiency is enhanced by sequential combustion sequences starting in an auxiliary, cyclically varying expansion volume including a device to initiate ignition of a mixture of fuel and air in a first phase of combustion, with the mixture being sufficiently richer than stoichiometric to suppress the formation of oxides of nitrogen, said auxiliary, cyclically varying expansion volume containing substantially all the fuel to be burned in one cycle together with only some of the air to be burned in one cycle;

an intermediate chamber between said auxiliary cyclically varying expansion volume and the interior of said cylinder of said piston/cylinder assembly, such that within said intermediate chamber all said fuel which was unburned during said first phase of combustion in said auxiliary, cyclically varying expansion volume is substantially completely combined with oxygen prior to entering said interior of said cylinder; and insulation substantially surrounding said auxiliary, cyclically varying expansion volume when said volume is at its minimum when said internal combustion engine is producing power.

12. The engine as set forth in claim 11 in which said insulation surrounding said auxiliary, cyclically varying expansion volume is covered with a layer of solid material, said layer of solid material being interposed between said insulation and said auxiliary, cyclically varying expansion volume.

13. The engine as set forth in claim 12 in which said layer of solid material is of sufficient thickness to integrate thermal heating of the beginning of said first phase of combustion to such a degree that a surface temperature of said layer of solid material does not exceed a pre-ignition temperature of fuel and air in said cyclically varying expansion volume.

14. The engine as set forth in claim 12 in which said piston of said piston/cylinder assembly has an area facing a main, cyclically varying expansion volume of said piston/cylinder assembly, said area of said piston being insulated from said piston.

15. The engine as set forth in claim 14 in which said area comprises insulation movable with said piston.

16. The engine as set forth in claim 14 above in which said area is sheet metal movable with said piston, said sheet metal being separated from said piston in said area insulated from said piston and in which gas in said separated area forms said insulation.

17. A spark ignition internal combustion engine comprising:

a piston/cylinder assembly in which output torque is controlled by control of fuel delivery, and pollutants are minimized while efficiency is enhanced by sequential combustion sequences starting in an auxiliary, cyclically varying expansion volume including a device to initiate ignition of a mixture of fuel and air in a first phase of combustion, with the mixture being sufficiently richer than stoichiometric to suppress the formation of oxides of nitrogen, said auxiliary, cyclically varying expansion volume containing substantially all the fuel to be burned in one cycle together with only some of the air to be burned in one cycle; and an intermediate chamber between said auxiliary cyclically varying expansion volume and the interior of said cylinder of said piston/cylinder assembly, such that within said intermediate chamber all said fuel which was unburned during said first phase of combustion in said auxiliary, cyclically varying expansion volume is substantially completely combined with oxygen prior to entering said interior of said cylinder, said intermediate chamber being contained within a component fabricated of stainless steel closed cell foam.

\* \* \* \* \*